(12) United States Patent
Griffin

(10) Patent No.: US 9,081,588 B2
(45) Date of Patent: Jul. 14, 2015

(54) EXECUTION TIME PROFILING FOR INTERPRETED PROGRAMMING LANGUAGES

(71) Applicant: Mentor Graphics Corporation, Wilsonville, OR (US)

(72) Inventor: Brian Griffin, Beaverton, OR (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 13/755,737

(22) Filed: Jan. 31, 2013

(65) Prior Publication Data

US 2013/0232477 A1 Sep. 5, 2013

Related U.S. Application Data

(60) Provisional application No. 61/741,764, filed on Jan. 31, 2012.

(51) Int. Cl.
*G06F 9/44* (2006.01)
*G06F 9/45* (2006.01)
*G06F 9/455* (2006.01)
*G06F 11/34* (2006.01)

(52) U.S. Cl.
CPC .......... *G06F 8/4441* (2013.01); *G06F 9/45508* (2013.01); *G06F 11/3466* (2013.01); *G06F 2201/865* (2013.01)

(58) Field of Classification Search
None
See application file for complete search history.

(56) References Cited

U.S. PATENT DOCUMENTS

| | | | | |
|---|---|---|---|---|
| 6,226,789 B1 * | 5/2001 | Tye et al. | ...... | 717/138 |
| 6,691,302 B1 * | 2/2004 | Skrzynski et al. | ...... | 717/118 |
| 6,763,452 B1 * | 7/2004 | Hohensee et al. | ...... | 712/227 |
| 6,826,748 B1 * | 11/2004 | Hohensee et al. | ...... | 717/130 |
| 6,941,545 B1 * | 9/2005 | Reese et al. | ...... | 717/130 |
| 6,954,923 B1 * | 10/2005 | Yates et al. | ...... | 717/130 |
| 7,047,394 B1 * | 5/2006 | Van Dyke et al. | ...... | 712/209 |
| 7,293,260 B1 * | 11/2007 | Dmitriev | ...... | 717/130 |
| 7,954,094 B2 * | 5/2011 | Cascaval et al. | ...... | 717/145 |
| 2002/0032718 A1 * | 3/2002 | Yates et al. | ...... | 709/107 |
| 2004/0015895 A1 * | 1/2004 | Hagiwara et al. | ...... | 717/139 |
| 2004/0073893 A1 * | 4/2004 | Rajaram et al. | ...... | 717/136 |
| 2006/0218536 A1 * | 9/2006 | Kirilline et al. | ...... | 717/127 |
| 2008/0307396 A1 * | 12/2008 | Broman et al. | ...... | 717/130 |
| 2009/0007075 A1 * | 1/2009 | Edmark et al. | ...... | 717/128 |
| 2009/0313005 A1 * | 12/2009 | Jaquinta | ...... | 704/2 |
| 2010/0042979 A1 * | 2/2010 | Nanja et al. | ...... | 717/136 |
| 2010/0100873 A1 * | 4/2010 | Shagin | ...... | 717/130 |
| 2011/0214108 A1 * | 9/2011 | Grunberg et al. | ...... | 717/128 |
| 2011/0258616 A1 * | 10/2011 | Sollich | ...... | 717/146 |
| 2011/0271260 A1 * | 11/2011 | Kwon et al. | ...... | 717/138 |
| 2012/0084776 A1 * | 4/2012 | Pirvu | ...... | 718/1 |

* cited by examiner

*Primary Examiner* — Chameli Das
(74) *Attorney, Agent, or Firm* — Banner & Witcoff, Ltd.

(57) ABSTRACT

Aspects of the invention are directed towards profiling computer programs that include interpreted functions. Various implementations provide for profiling a computer program, written in a first programming language, which includes an interpretive function that can execute a computer program, written in a second programming language. During profiling, when the interpretive function is called, the functions of the computer program written in the second programming languages are profiled.

21 Claims, 4 Drawing Sheets

EXECUTION TIME PROFILING FOR INTERPRETED PROGRAMMING LANGUAGES

FIELD OF THE INVENTION

The present invention is directed towards the field of software profiling. More specifically, the present invention is directed towards profiling the execution time for interpreted computer programming languages.

BACKGROUND OF THE INVENTION

Computer programs, that is, operations executed on a computing device, are used in many industries. One industry that relies heavily on computer programs is the electronic design automation (EDA) industry. In general, the EDA industry provides computer programs to electronic designers and manufactures to assist them in the design and manufacture of different electronic devices. For example, some EDA tools provide computer software that allows an engineer to optimize the design for an integrated circuit. Other software programs are provided that allow for the simulation of electronic designs. These simulation programs, referred to as a simulators, imitate the behavior of an electronic device based upon its design. Simulation is used to subject the design to various tests, so that errors and necessary corrections to the design can be made prior to dedicating the resources to manufacture the device.

The time and resources necessary to execute these EDA software programs increase, often exponentially, with the size of the electronic device. For example, a modern electronic circuit includes over a billion transistors. Software programs that simulate the behavior of a design of this magnitude require significant amounts of computing resources and time to execute. Accordingly, the programs are often optimized in an effort to reduce the time and resources needed.

To assist in this optimization, the software program is executed and various metrics, such as, for example, execution time per function, may be observed. Other metrics, such as, for example, memory usage per function, can also be observed. The observed metrics can then be used to determine where the software program should be improved to reduce the time and resources it needs to execute. The observation of the various metrics is generally referred to as profiling. In the field of EDA, profiling is especially important, as a reduction in resources and execution times translates into quicker design cycles and faster time to market for devices.

Various different techniques for profiling computer programs exist. For example, a timer can be used to record the time spent executing the functions within the software program. Subsequently, a profile could be built based on these recorded times. This technique commonly is referred to as "instrumented profiling." Another type of profiling, referred to as "sampling," periodically checks to see which function is being executed. A profile can then be built from the sampled responses. FIG. 4 shows a sample profile 401, which, as can be seen, lists the functions 403 and the percentage of time 405 spent executing each function 403.

Many tools and techniques exist for building a profile as described above. However, where the computer program includes interpreted portions. These techniques are unsuitable to build an accurate profile. More specifically, where the computer program includes functions 403 that interpret or execute other computer programs or functions written in a different computer programming language, conventional profiling techniques do not accurately report statistics of resource usage and execution time. As will be appreciated, the interpretive function, such as, for example, the function 403 (i.e. interpretive function 1) shown in FIG. 4, will be reported as consuming time or resources during profiling, as opposed to the actual functions being interpreted.

BRIEF SUMMARY OF THE INVENTION

Aspects of the invention are directed towards profiling computer programs that include interpreted functions. Various implementations provide for profiling a computer program, written in a first programming language, which includes an interpretive function that can execute a computer program, written in a second programming language. During profiling, when the interpretive function is called, the functions of the computer program written in the second programming languages are profiled. More specifically, the functions being interpreted, that is, the functions from the computer program written in the second programming language that are being executed, are profiled.

In some implementations, a sampled profiling technique is used. Accordingly, when an interpretive function is reported as currently being executed by the profiler, the program execution stack is examined to determine which function is being interpreted by the interpretive function. Subsequently, the interpreted function is then reported as being currently executed by the profiler as opposed to the interpretive function.

With some implementations, an instrumented profiling technique is used. Accordingly, when an interpretive function is executed, the program execution stack is examined to determine which function is being interpreted. Subsequently, the execution time for the interpreted function, as opposed to the interpretive function, will be recorded.

These and additional implementations of invention will be further understood from the following detailed disclosure of illustrative embodiments.

BRIEF DESCRIPTION OF THE DRAWINGS

The present invention will be described by way of illustrative implementations shown in the accompanying drawings in which like references denote similar elements, and in which.

DETAILED DESCRIPTION OF THE INVENTION

The operations of the disclosed implementations may be described herein in a particular sequential order. However, it should be understood that this manner of description encompasses rearrangements, unless a particular ordering is required by specific language set forth below. For example, operations described sequentially may in some cases be rearranged or performed concurrently. Moreover, for the sake of simplicity, the illustrated flow charts and block diagrams typically do not show the various ways in which particular methods can be used in conjunction with other methods.

It should also be noted that the detailed description sometimes uses terms such as "generate" to describe the disclosed implementations. These terms are often high-level abstractions of the actual operations that are performed. The actual operations that correspond to these terms will often vary, that their particular implementation will be apparent to those of ordinary skill in the art without a more detailed explanation.

Some of the methods described herein can be implemented by software stored on a computer readable storage medium, or executed on a computer. Accordingly, some of the disclosed methods may be implemented as part of a computer implemented electronic design automation ("EDA") tool. The selected methods could be executed on a single computer or a computer networked with another computer or computers.

Illustrative Operating Environment

Figure 1:
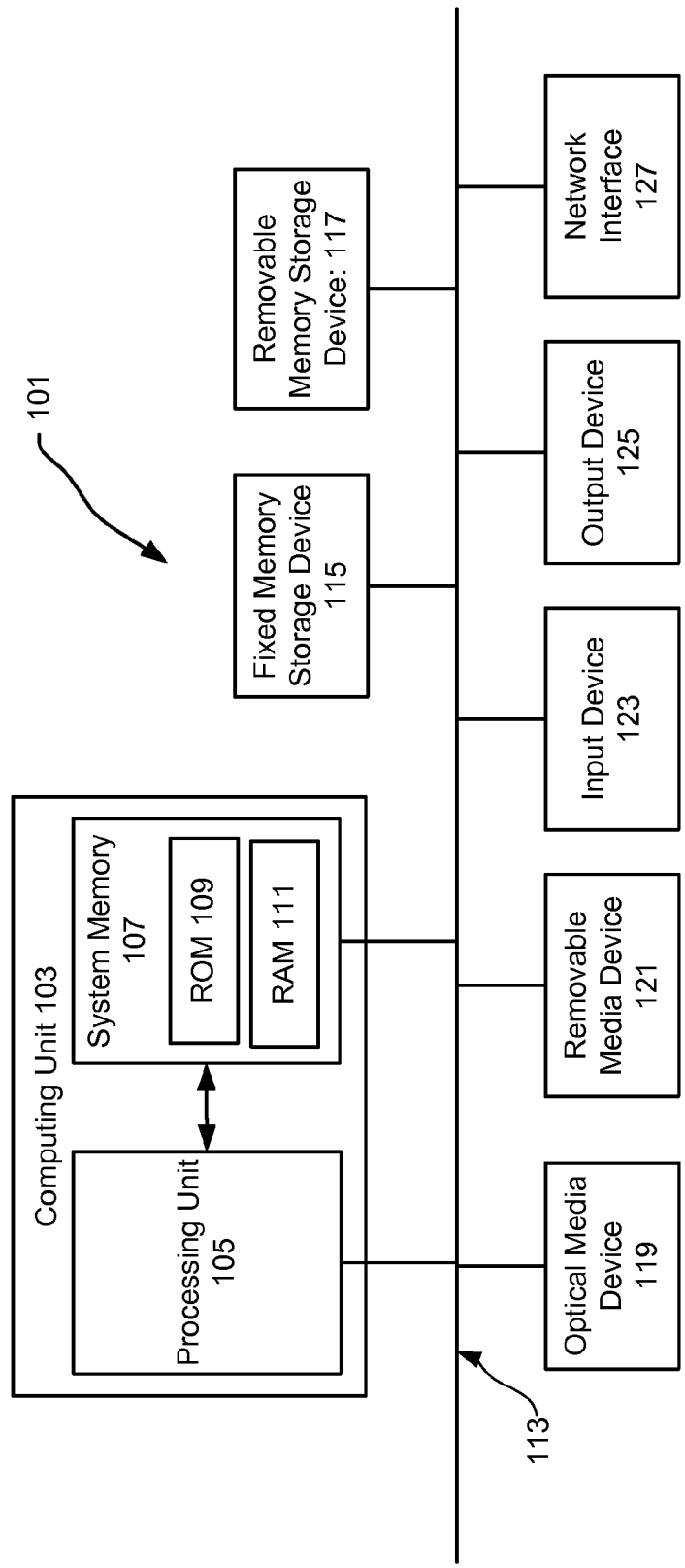
FIG. 1 illustrates a computing device that may be used to implement various embodiments of the present invention.

As the techniques of the present invention may be implemented using software instructions, the components and operation of a computer system on which various implementations of the invention may be employed is described. Accordingly, FIG. 1 shows an illustrative computing device 101. As seen in this figure, the computing device 101 includes a computing unit 103 having a processing unit 105 and a system memory 107. The processing unit 105 may be any type of programmable electronic device for executing software instructions, but will conventionally be a microprocessor. The system memory 107 may include both a read-only memory ("ROM") 109 and a random access memory ("RAM") 111. As will be appreciated by those of ordinary skill in the art, both the ROM 109 and the RAM 111 may store software instructions for execution by the processing unit 105.

The processing unit 105 and the system memory 107 are connected, either directly or indirectly, through a bus 113 or alternate communication structure, to one or more peripheral devices. For example, the processing unit 105 or the system memory 107 may be directly or indirectly connected to one or more additional devices, such as; a fixed memory storage device 115, for example, a magnetic disk drive; a removable memory storage device 117, for example, a removable solid state disk drive; an optical media device 119, for example, a digital video disk drive; or a removable media device 121, for example, a removable floppy drive. The processing unit 105 and the system memory 107 also may be directly or indirectly connected to one or more input devices 123 and one or more output devices 125. The input devices 123 may include, for example, a keyboard, a pointing device (such as a mouse, touchpad, stylus, trackball, or joystick), a scanner, a camera, and a microphone. The output devices 125 may include, for example, a monitor display, a printer and speakers. With various examples of the computing device 101, one or more of the peripheral devices 115-125 may be internally housed with the computing unit 103. Alternately, one or more of the peripheral devices 115-125 may be external to the housing for the computing unit 103 and connected to the bus 113 through, for example, a Universal Serial Bus ("USB") connection.

With some implementations, the computing unit 103 may be directly or indirectly connected to one or more network interfaces 127 for communicating with other devices making up a network. The network interface 127 translates data and control signals from the computing unit 103 into network messages according to one or more communication protocols, such as the transmission control protocol ("TCP") and the Internet protocol ("IP"). Also, the interface 127 may employ any suitable connection agent (or combination of agents) for connecting to a network, including, for example, a wireless transceiver, a modem, or an Ethernet connection.

It should be appreciated that the computing device 101 is shown here for illustrative purposes only, and it is not intended to be limiting. Various embodiments of the invention may be implemented using one or more computers that include the components of the computing device 101 illustrated in FIG. 1, which include only a subset of the components illustrated in FIG. 1, or which include an alternate combination of components, including components that are not shown in FIG. 1. For example, various embodiments of the invention may be implemented using a multi-processor computer, a plurality of single and/or multiprocessor computers arranged into a network, or some combination of both.

As stated above, various embodiments of the invention may be implemented using software instructions. These software instructions may be stored on one or more computer readable media or devices, such as, for example, the system memory 107, or an optical disk for use in the optical media device 119. As those of ordinary skill in the art will appreciate, software instructions stored in the manner described herein are inherently non-transitory in nature. More specifically, the software instructions are available for execution by the computer system 101, as opposed to being transmitted to the computer system via a carrier wave or some other transitory signal.

Interpretive Code Profiling

Figure 2:
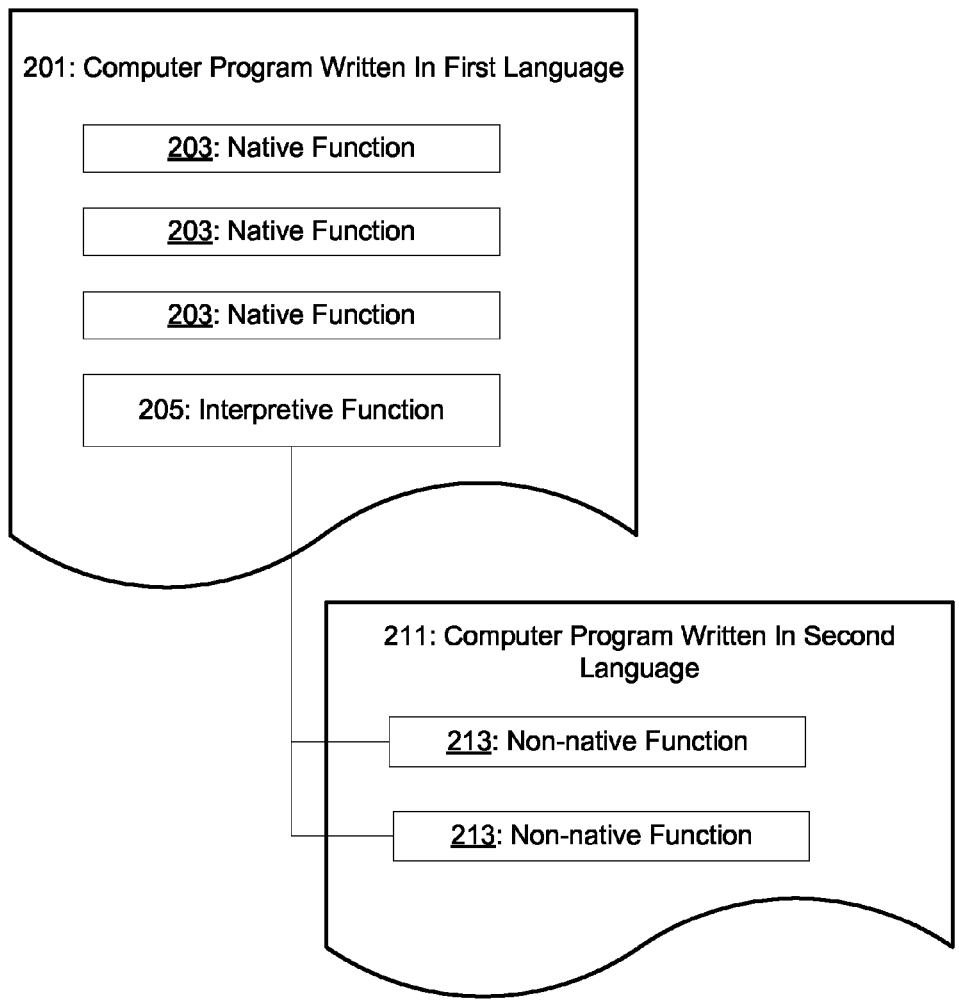
FIG. 2 illustrates an interpretive computer program.

As indicated above, aspects of the invention are directed towards profiling computer programs that include the capability to execute another computer program written in a programming language different than the original computer program. These types of programs are referred to as "dynamic" or "interpretive" programs. FIG. 2 illustrates an interpretive computer program 201, which includes a number of native functions 203 and an interpretive function 205. As those of ordinary skill in the art will appreciate, computer programs are often expressed using a programming language. This programming language defines specific operations to be performed by a programmable computer system, such as the programmable computing device 101. These operations or collections of operations are often referred to as "functions." For example, a one of the functions 203 could describe a process of saving data to a computer-readable storage medium.

A programming language is composed of a vocabulary (i.e. a set of words and symbols having a predefined meaning) and syntax, where the syntax defines rules for arranging the words and symbols. There are many different types of programming languages, such as, for example, C++, Java, and Visual Basic. As those of ordinary skill in the art will appreciate, in order to execute a computer program on a computing device (e.g., the computing device 101) the computer program needs to be compiled into computer readable instructions. More specifically, the vocabulary and syntax used to express the computer program are translated into instructions that the computing device can process. This translation process differs for different programming languages. Accordingly, problems typically occur when a computer program, such as the computer program 201 includes functions 203 written in different programming languages.

Accordingly, in order to allow for the interchangeability of different programming languages, a function written in a first programming language, which allows another function written in a different programming language, to be executed as part of a computer program is typically provided. FIG. 2 shows another computer program 211 having non-native functions 213, which as can be seen are written in a programming language different than the computer program 201. As used herein, a native function is a function written in the same programming language as the computer program under which it to be executed. Accordingly, the functions 213, although native with respect to the computer program 211, are "non-native" with respect to the computer program 201. For example, the computer program 201 may be written in the C programming language, while the computer program 211 may be written in the tool command language, commonly referred to as "Tcl." In other implementations, the computer program 201 may be written in the C++ programming language, while the computer program 211 may be written in the Java programming language.

Figure 4:
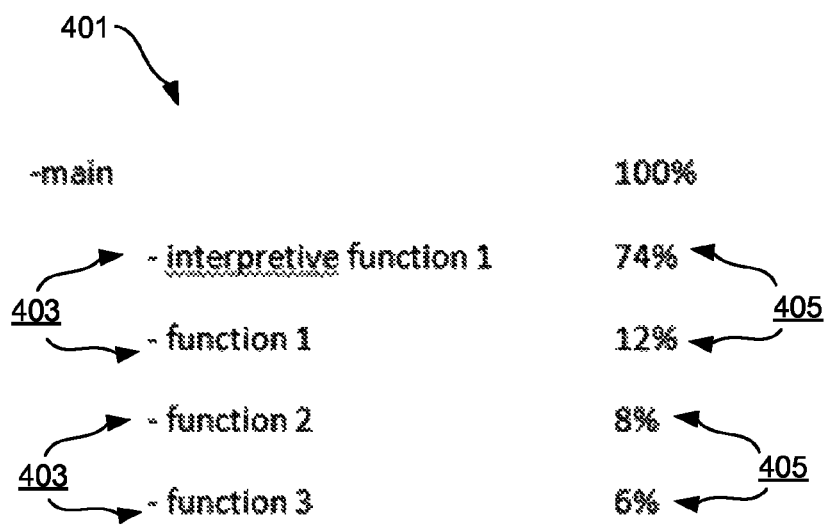
FIG. 4 illustrates a sample profile.

During execution of the computer program 201, the interpretive function 205 can be "called" or executed, which will cause one of the non-native functions 213 to be executed. That non-native function 213 then will be processed by the interpretive function 205 such that the non-native function 213 is executable by the computing device executing the computer program 201. However, as indicated above, if conventional techniques were used to profile the execution of the computer program 201, the interpretive function 205 will be reported. More particularly, each time a one of the non-native functions 213 is executed, the interpretive function 205 will be reported as taking the execution time or consuming the reported resources. For example, as introduced above, FIG. 4 shows the profile 401 listing the percentage of time 405 that each function was executing. However, the interpretive function 403 (e.g. the interpretive function 205) is reported, as opposed to the non-native functions 213 being interpreted. Accordingly, any profile built from conventional techniques will not take into account the non-native functions 213. That is, the profile will provide no insight into how long any of the non-native functions 213 took to execute or the amount of computing resources consumed during execution of the non-native functions 213. As used herein, the non-native functions are referred to as "interpreted" functions, that is, the non-native functions 213 may be referred to as "interpreted functions" 213. Furthermore, the operation of allowing the interpreted functions to be executed as part of the computer program 201 is referred to as interpretation. Accordingly, it may also be said that the interpreted functions 213 are "interpreted" by the interpretive functions 205. Those of ordinary skill in the art will appreciate the distinction as used herein without further explanation.

Figure 3:
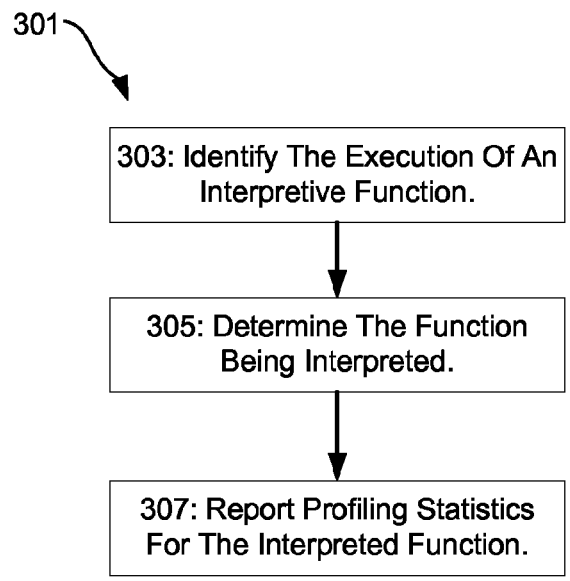
FIG. 3 illustrates a method of profiling an interpretive computer program.

FIG. 3 illustrates a method 301 for profiling a computer program that may be provided by various implementations of the present invention. As can be seen from this figure, the method 301 includes an operation 303 identifying the execution of an interpretive function. In various implementations, the operation 303 will identify the execution of an interpretive function during operation of the computer program. More particularly, as the computer program is being executed as part of the profiling process, the operation 303 will identify when the interpretive function itself is executing. In other implementations, the operation 303 will identify execution of the interpretive function from program stack logs after operation of the computer program has completed.

In some implementations, a sampled profiling approach, as detailed above, may be used. More specifically, periodically during operation of the computer program 201, which function (i.e. native functions 203 or interpretive function 205) is currently executing is determined. With some implementations, the instrumented approach detailed above may be used. More specifically, as execution of a new function begins, this function will be identified.

The method 301 further includes an operation 305 for examining the program stack to determine which non-native function 213 is being interpreted. More particularly, the operation 305 examines the program stack to determine which non-native function 213 is being interpreted by the interpretive function 205. As used herein, the program stack refers to the collection of information about active subroutines within the computer program. The program stack is commonly referred to as a "call stack" or simply the "stack." Those of ordinary skill in the art will appreciate that the program stack is implementation dependent and can take on many forms. However, in general, the program stack will be a structure of frames, where each frame contains the location where the computer program should resume execution when the function to which the frame corresponds terminates. Additionally, parameters passed to a particular function are commonly stored or referenced in the program stack. With various implementations, the operation 305 will access the program stack and determine identifying information of the interpreted function. For example, the frame corresponding to the identified interpretive function may be checked for this identifying information. In some implementations, the frame a specified offset away from the frame corresponding to the identified interpretive function may be checked for this identifying information. For example, the frame an offset away of 2 may be checked.

An operation 307 for associating profile information identified to occur during execution of the interpreted function with the interpreted function. More specifically, the profiling information, such as, for example, the amount of time spent executing the interpreted function, is associated with the interpreted function 213 as opposed to the interpretive function 205. As detailed above, other profiling information, such as, for example memory usage may be obtained. In some implementations, memory usage may be profiled by observing, such as, for example, at selected intervals or at the start of each functions execution, the amount of memory allocated and released from allocation. In some implementations, a list of memory addresses allocated for the computer program may be maintained. This list of memory addresses can then be used to determine the amount of memory required during the execution of particular functions.

Figure 5:
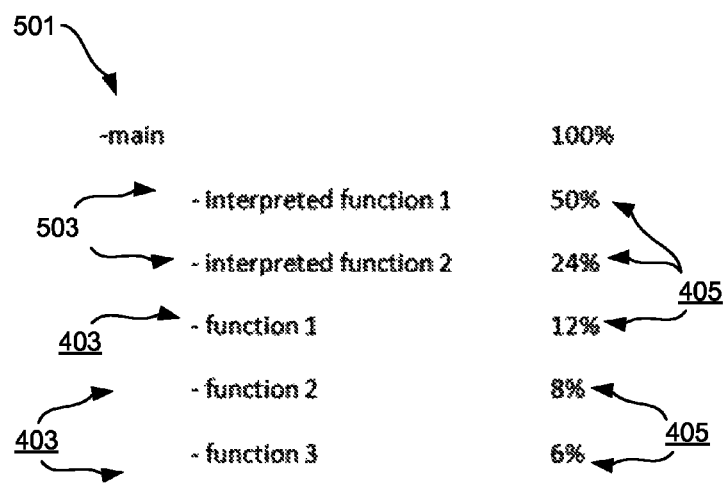
FIG. 5 illustrates a sample profile generated by various implementations of the present invention.

FIG. 5 shows a sample profile 501, which may be generated based on various implementations of the present invention. As can be seen from this figure, the profile 501 shows the functions 403 from FIG. 4, along with the percentage of time executed. However, the interpreted functions 503 (e.g. the functions 213) are now shown, as opposed to the interpretive function 205. As can be seen from this profile, a significant amount of computing time (i.e. 50%) was spent on executing the interpreted function 1. This type of information could then be used, as discussed above, to optimize the interpreted function 1 in order to increase its efficiency and, by extension, the efficiency of the overall program.

Figure 6:
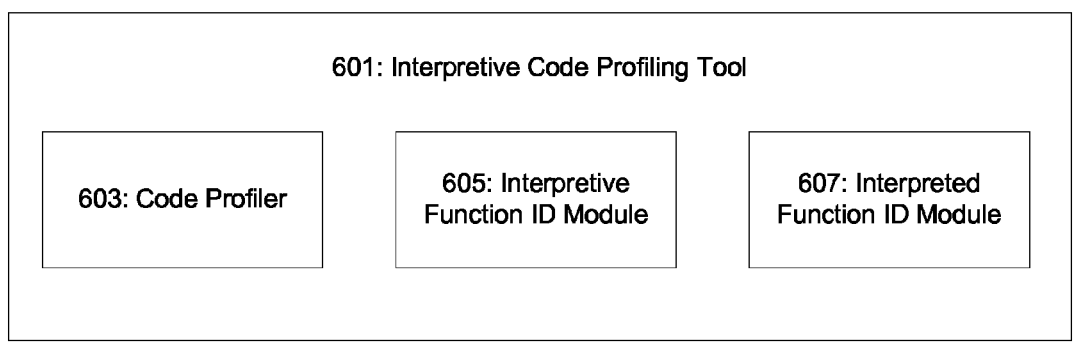
FIG. 6 illustrates an interpretive computer program profiling tool.

FIG. 6 shows an interpretive program profiling tool 601 that may be provided by various implementations of the present invention. As can be seen from this figure, the tool 601 includes a code profiler 603. As detailed above, various different methods and tools exists, such as, for example, instrumented or sampled, for profiling a computer program. The code profiler 603 is configured to observe various metrics as described above in order to build a profile for the execution of a software program. The tool 601 also includes an interpretive function ID module 605 configured to identify when the code profiler is collecting information regarding an interpretive function. In various implementations, the module 605 monitors the program execution stack to determine this. An interpreted function ID module 607 is then provided to determine which function is being interpreted and substitute identifying information for this function into the profile, in place of identifying information for the interpretive function.

CONCLUSION

Although certain devices and methods have been described above in terms of the illustrative embodiments, the person of ordinary skill in the art will recognize that other embodiments, examples, substitutions, modification and alterations are possible. It is intended that the following claims cover such other embodiments, examples, substitutions, modifications and alterations within the spirit and scope of the claims.

What is claimed is:

1. A method comprising:
   executing, by a computing device, software that (a) is written in a first programming language, (b) calls one or more native interpretive functions that interpret one or more non-native functions written in a second programming language different from the first programming language to enable the computing device to execute the one or more non-native functions, and (c) calls one or more native functions written in the first programming language for execution by the computing device, wherein each of the one or more native interpretive functions is written in the first programming language; and
   profiling execution of the software by:
      identifying, based on execution of the one or more native interpretive functions, which of the one or more non-native functions is interpreted by the one or more native interpretive functions, resulting in an identified non-native function,
      obtaining profile information that describes one or more characteristics of how the identified non-native function executed on the computing device,
      identifying which of the one or more native functions is being executed, resulting in an identified native function, and
      obtaining additional profile information that describes one or more characteristics of how the identified native function executed on the computing device.

2. The method recited in claim 1, wherein the profile information comprises execution time of the identified non-native function and an amount of computing resources consumed by the identified non-native function, wherein the additional profile information comprises execution time of the identified native function, and wherein the method further comprises:
   generating a profile for the software that includes the execution time of the identified non-native function, the amount of computing resources consumed by the identified non-native function, and the execution time of the identified native function.

3. The method recited in claim 1, further comprising:
   obtaining identifying information that identifies the one or more non-native functions; and
   employing the identifying information to associate the profile information with the one or more non-native functions.

4. The method recited in claim 1, further comprising:
   profiling the execution of the software by identifying the execution of the one or more native interpretive functions based on an examination of program stack logs after execution of the software is complete.

5. The method recited in claim 1, wherein obtaining the profile information comprises determining the one or more characteristics based on an examination of a program stack.

6. The method recited in claim 5, wherein the program stack comprises a structure of frames;
   wherein each frame of the structure of frames comprises a location at which the software is to resume responsive to termination of the one or more non-native functions; and
   wherein determining the one or more characteristics based on the examination of the program stack comprises:
      identifying an offset in the structure of frames at which identifying information for the one or more native interpretive functions is located, and
      examining an offset frame that is located in the structure of frames at the offset from a frame in the structure of frames that corresponds to one of the one or more native interpretive functions.

7. The method recited in claim 1, wherein the first programming language is native to the computing device, and wherein the second programming language is non-native to the computing device.

8. The method recited in claim 1, wherein the execution of the one or more native interpretive functions comprises execution of the one or more non-native functions.

9. The method recited in claim 1, wherein obtaining the profile information comprises determining an amount of time spent executing the one or more non-native functions, and wherein the amount of time is included in the profile information as one of the one or more characteristics.

10. The method recited in claim 1, wherein the first programming language is one of either C and C++, and
    wherein the second programming language is the JAVA programming language.

11. The method recited in claim 1, further comprising:
    profiling the execution of the software by identifying the execution of the one or more native interpretive functions based on an examination of program stack logs periodically during execution of the software.

12. The method in claim 1, wherein the software is part of an electronic design automation (EDA) tool for designing electronic devices.

13. One or more computer-readable storage devices storing executable instructions that, when executed, cause a computer to:
    execute software that (a) is written in a first programming language (b) calls one or more native interpretive functions that interpret one or more non-native functions written in a second programming language different from the first programming language to enable the computer to execute the one or more non-native functions, and (c) calls one or more native functions written in the first programming language for execution by the computing device, wherein each of the one or more native interpretive functions is written in the first programming language; and
    profile execution of the software by:
       identifying, based on execution of the one or more native interpretive functions, which of the one or more non-native functions is interpreted by the one or more native interpretive functions, resulting in an identified non-native function,
       obtaining profile information that describes one or more characteristics of how the identified non-native function executed on the computer,
       identifying which of the one or more native functions is being executed, resulting in an identified native function, and
       obtaining additional profile information that describes one or more characteristics of how the identified native function executed on the computing device.

14. The one or more computer-readable storage devices recited in claim 13, wherein the executable instructions, when executed, cause the computer to generate an execution profile for the software based upon execution of the software, wherein the execution profile includes the profile information and the additional profile information.

15. The one or more computer-readable storage devices recited in claim 13, wherein the executable instructions, when executed, cause the computer to:
obtain identifying information that identifies the one or more interpreted functions; and
employ the identifying information to associate the profile information with the one or more non-native functions.

16. The one or more computer-readable storage devices recited in claim 13, wherein the executable instructions, when executed, cause the computer to profile the execution of the software by identifying the execution of the one or more native interpretive functions based on an examination of program stack logs after execution of the software is complete.

17. The one or more computer-readable storage devices recited in claim 6, wherein obtaining the profile information comprises determining the one or more characteristics based on an examination of a program stack.

18. An apparatus comprising:
one or more processors; and
memory storing executable instruction that, when executed by the one or more processors, cause the apparatus to:
execute software that (a) is written in a first programming language (b) calls one or more native interpretive functions that interpret one or more non-native functions written in a second programming language different from the first programming language to enable the apparatus to execute the one or more non-native functions, and (c) calls one or more native functions written in the first programming language for execution by the apparatus, wherein each of the one or more native interpretive functions is written in the first programming language; and
profile execution of the software by:
identifying, based on execution of the one or more native interpretive functions, which of the one or more non-native functions is interpreted by the one or more native interpretive functions, resulting in an identified non-native function,
obtaining profile information that describes one or more characteristics of how the identified non-native function executed on the apparatus,
identifying which of the one or more native functions is being executed, resulting in an identified native function, and
obtaining additional profile information that describes one or more characteristics of how the identified native function executed on the apparatus.

19. The apparatus recited in claim 18, wherein the executable instructions, when executed by the one or more processors, cause the apparatus to generate an execution profile for the software based upon execution of the software, wherein the execution profile includes the profile information and the additional profile information.

20. The apparatus recited in claim 18, wherein the executable instructions, when executed by the one or more processors, cause the apparatus to profile the execution of the software by identifying the execution of the one or more native interpretive functions based on an examination of program stack logs after execution of the software is complete.

21. The apparatus recited in claim 18, wherein obtaining the profile information comprises determining the one or more characteristics based on an examination of a program stack.

* * * * *